United States Patent
Henerlau et al.

(10) Patent No.: US 6,442,660 B1
(45) Date of Patent: Aug. 27, 2002

(54) DYNAMIC SYSTEM RELOCATION BASED ON AVAILABILITY OF SYSTEM MEMORY

(75) Inventors: Paul Richard Henerlau, Portland, OR (US); Thomas Daniel Davis, Jr., Fairhope, AL (US); Jack Van Oosterhout, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 27 days.

(21) Appl. No.: 09/814,332

(22) Filed: Mar. 21, 2001

(51) Int. Cl.[7] .............................................. G06F 12/00
(52) U.S. Cl. ...................... 711/165; 711/161; 707/203; 707/204
(58) Field of Search ................................ 711/161, 162, 711/165; 707/203, 204

(56) References Cited

U.S. PATENT DOCUMENTS

| 4,138,738 A | 2/1979 | Drogichen |
|---|---|---|
| 5,029,078 A | 7/1991 | Iwai |
| 6,216,224 B1 * | 4/2001 | Klein ........................ 709/222 |

\* cited by examiner

Primary Examiner—Hiep T. Nguyen
(74) Attorney, Agent, or Firm—Robert D. Varitz, P.C.

(57) ABSTRACT

In a computer system having an embedded application, a method of dynamic system relocation, including creating a ROM version of an embedded application which is executable from ROM; creating a RAM version of the embedded application which is executable from RAM; comparing the RAM version of the embedded application to the ROM version of the embedded application to identify differences between the RAM version and the ROM version; storing the differences between the ROM version and the RAM version in a relocation table; storing the ROM version of the embedded application and the relocation table in ROM; on system initialization; conditionally copying the ROM version of the embedded application into RAM; modifying the copied ROM version now in RAM as a function of the differences stored in the relocation table; and executing the embedded application from the RAM version of the embedded application.

14 Claims, 3 Drawing Sheets

DYNAMIC SYSTEM RELOCATION BASED ON AVAILABILITY OF SYSTEM MEMORY

FIELD OF THE INVENTION

This invention relates to electrical computer and digital processing systems and specifically to the storage/relocation of programs and/or operating systems. Such storage and relocation has application in the field of copier/printer devices, and in other ROM-based embedded applications.

BACKGROUND OF THE INVENTION

Embedded computer systems usually perform faster when executing out of random-access-memory (RAM), rather than when executing out of the read-only memory (ROM) in which the programs are stored, because of the reduced wait states of RAM vs. ROM. There is, however, no known prior art which allows operating systems to conditionally, or dynamically, execute out of RAM to take advantage of systems with large amounts of memory. Known systems are configured to execute from either ROM or RAM, exclusively.

Techniques are known which use dynamically configuring address lines to utilize faster memory, or to utilize hardware registers to facilitate relocation of programs, but such systems have not addressed dynamically relocating the ROM image of a program into RAM for faster execution.

Hardware support is another technique used to solve the problems of relocating a program's code and data. Some processors and IC boards provide the capability of loading dedicated relocation registers with offset values, which are then used when memory references are executed by the program. U.S. Pat. No. 4,138,738 to Drogichen, granted Feb. 6, 1979, for Self-contained relocatable memory subsystem, describes one such system.

Another technique, known as "Position Independent Code (PIC)" or "Position Independent Data (PID)," relies upon the processor providing position independent instructions, i.e., allowing code and data access independent of where in memory the program is executing. While similar to the technique of U.S. Pat. No. 4,138,738, the registers used for PIC and PID are general purpose registers, usually located within the processor, rather than dedicated internal or external registers.

In the technique known as "Traditional Relocation," the program is stored in an interim state in ROM, having the information contained therein which is required used when the program is loaded into RAM. The information is used by the relocating loader to modify those parts of the program's code and data which are dependent upon where the program is loaded into memory. The image stored in ROM is itself not executable; it is only executable after it has been positioned in RAM and the relocation values adjusted.

U.S. Pat. No. 5,029,078 to Iwai, granted Jul. 2, 1991, for Program loading method with relocation address, describes a method in the non-embedded environment, providing for dynamic relocation of a program within a disc-based operating system. The application is stored in a relocatable format, not in an executable format. The relocation occurs only with operator intervention to support other transient programs, rather than a relocation based upon execution from faster RAM memory, an assessment made dynamically during the system initialization.

SUMMARY OF THE INVENTION

In a computer system having an embedded application, a method of dynamic system relocation, including creating a ROM version of an embedded application which is executable from ROM; creating a RAM version of the embedded application which is executable from RAM; comparing the RAM version of the embedded application to the ROM version of the embedded application to identify differences between the RAM version and the ROM version; storing the differences between the ROM version and the RAM version in a relocation table; storing the ROM version of the embedded application and the relocation table in ROM; on system initialization; conditionally copying the ROM version of the embedded application into RAM; modifying the copied ROM version now in RAM as a function of the differences stored in the relocation table; and executing the embedded application from the RAM version of the embedded application.

It is an object of this invention to provide a system which has knowledge of its configuration in either a ROM or RAM target.

Another object of the invention is to provide a system having an intelligent startup code which may assess the amount of system memory, which if suitably large, e.g., 32 MByte or greater, make a copy of itself in RAM, relocate the data and execute from the RAM image.

A further object of the invention is to provide a copier/printer device having a dynamic system relocation capability.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

The current invention provides a method for creating a single version of an embedded application, or system, which may be executed from either ROM or RAM, without the use of specialized hardware support or restricting itself to the use of position independent instructions and data, which techniques are inherently slower because of the added level of indirection and register utilization. With the method of the invention, it is possible for a stored application to assess the amount of memory available in a system and conditionally, or dynamically, relocate itself into RAM, when sufficient RAM is available.

The standard process of taking a program from its source code to its ultimate execution on a target computer requires a number of steps: compiling the source code, optionally linking the source code to required libraries, loading the source code into memory, modifying those parts of the source code or data which are dependent upon where the program is loaded in memory, and starting execution. This process is well known, and is documented in any standard text book on operating systems, such as Peterson and Silberschatz, *Operating System Concepts*, Addison-Wesley, 1985. It should be noted that the compiler, linker, and loader are considered as integral parts of the operating system on which program development occurs.

In the world of embedded applications, frequently those programs permanently stored in ROM, there are some additional issues associated with the process, because mass storage devices and general purpose relocating loaders are not typically available when the application is ready for execution. Instead, the application, operating system, and whatever exists in the way of support tools are stored in ROM. There are several ways of dealing with the loading/relocating of embedded programs, again well documented in the literature, such as in D-CC & D-C++ *User's Guide, Version* 4.3, Diab Data Inc., Foster City, Calif.

Although embedded applications are typically stored in ROM, many embedded hardware platforms have RAM, which may be significantly faster than ROM. Where system performance is important, it is desirable to have an application execute from RAM; however, where memory is limited, it is necessary for an application to execute from ROM.

Software running on a general purpose controller executes significantly faster when running out of RAM, in contrast to execution from ROM. Several approaches have been considered to increase system performance by executing out of RAM, such as having distinct versions of the system, modifying the boot loader, utilizing a suitable compression algorithm, and the like.

The method of the invention requires only one version of the controller software. The method of the invention allows the system to assess the amount of memory available, and, if there is sufficient memory, the initialization code relocates the control software to execute entirely out of RAM.

The building of such a system involves creating two distinct versions of the embedded application or system, one for RAM and one for ROM, comparing the two systems, and storing the differences in a relocation table. These are stored in ROM during system initialization, the relocation table is used to modify the RAM copy of the system. After the system has made a copy of itself and correctly modified the values as described by the relocation table, the system then continues to execute from RAM.

Performance Comparison

With the system executing out of RAM, system performance improvements in excess of 50% may be achieved. This number is based upon the Postscript Processing Speed Test version 5.6, provided by Achilles, referred to as PPST56.ps. Representative numbers from this test include the following:

| Test Name | Invention RAM | Invention ROM |
|---|---|---|
| PPST-Image | 8.3 | 7.9 |
| PPST-Graphics | 80.7 | 45.6 |
| PPST-Fonts | 44.7 | 27.4 |
| PPST-Memory | 5.8 | 4.4 |
| PFST-Math | 63.8 | 47.8 |
| PPST Overall | 53.1 | 33.4 |

OVERVIEW

The data clearly provides a solid motivation for developing the invention for a system, and particularly for a copier/printer device, which uses higher speed RAM for execution of embedded application software. The technology requires an appreciation of some of the more subtle aspects of the linker and startup logic. In the broad overview, incorporating a relocating system for a copier/printer device involves two distinct steps: 1) creating a system which has knowledge of its configuration in either a ROM or a RAM target; 2) providing an intelligent startup code which may assess the amount of system memory, which if suitably large, e.g., 32 MByte or greater, makes a copy of itself in RAM, relocates the data, and executes from the RAM image.

The actual creation of the relocating system is straightforward:
1. Link a version of the system which executes out of ROM;
2. Link a version of the system which executes out of RAM using the same data libraries;
3. Compare the two hex files, and store the differences in a separate file (approximately 75,000 words are different in the copier/printer application); Create a "C" file with this data, now in a compressed format;
4. Compile and link the relocation data;
5. Append this hex file to the end of the ROM hex file, and checksum this composite file.

After the relocating system is created, the embedded application may now be stored in ROM using conventional techniques. The actual bootup and system relocation is as follows:
1. Begin low level initialization of hardware, memory;
2. Create the initialized data section of RAM;
3. Determine the amount of RAM available;
4. If the amount of RAM is less than the specified threshold, e.g., 32 MByte in this application, continue with system execution from ROM;
5. Else, copy the code portion of the ROM to the designated location in RAM, just above the data sections;
6. Using the data in the relocation table, modify the addresses of the RAM copy of the system, including code and data, to the corrected values, established when linking a RAM version of the system;
7. Jump to the RAM version of the startup code and continue the initialization and boot sequence.

Figure 1:
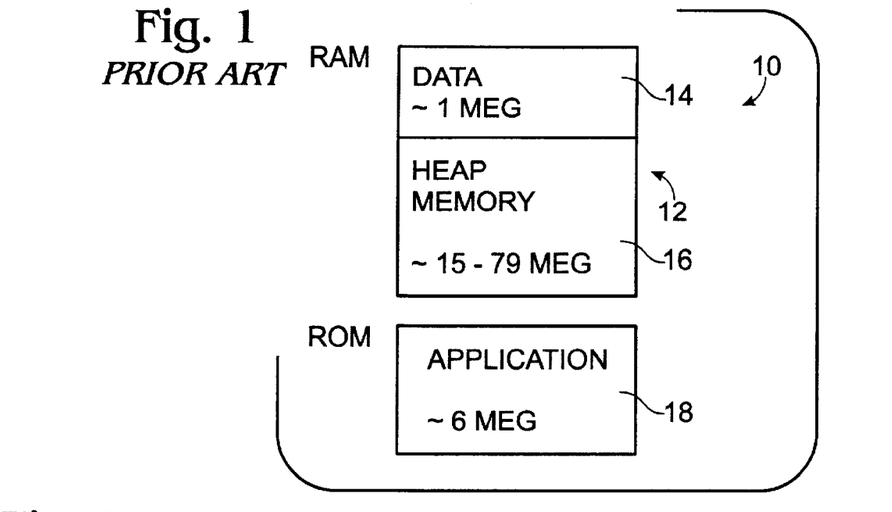
FIG. 1 is a memory map of a conventional embedded application.
Figure 2:
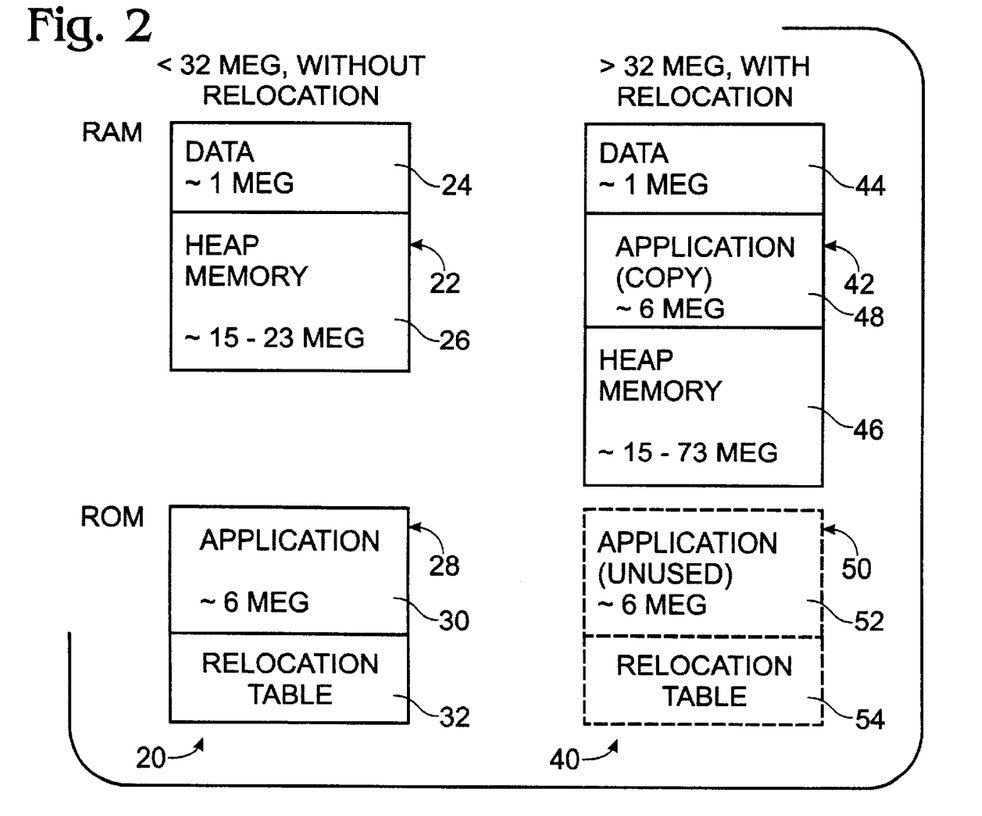
FIG. 2 is a memory map of a basic method of the invention.

Memory Map The method of the relocating loader is depicted in FIGS. 1 and 2. FIG. 1 is the memory map of a conventional embedded application, generally at 10. FIG. 1 depicts RAM 12 storage of the program data space 14 as well as the heap 16 of free memory, used for dynamic structures and images of rendered data, while ROM 18 is used to hold the actual program.

FIG. 2 depicts a relocating system according to the invention in the two cases where there is less than 32 MByte, 20, i.e., 16 MByte or 24 MByte, as well as when there is 32 MByte or greater available, 40, up to 80 MByte. In the case where the system is minimally configured for memory, the map resembles that of the version of the system depicted in FIG. 1, having RAM 22, data 24, heap 26, and ROM 28, containing an application 30 and a relocation table 32 is provided. In the case where there is more memory available, as shown at 40, the system includes RAM 42, Data 44, Heap 46 and an application copy 48. ROM 50 includes space for the application 52, which may be unused, and a relocation table 54. The program is copied and relocated from ROM into the area in RAM immediately following the program data space, and the free memory heap is moved up in memory. The total amount of free memory is decreased by the amount of RAM needed for the application. The technique of conditionally, or dynamically, inserting the copy of the program at the beginning of the heap memory, and adjusting the position of the heap memory, along with its reference, is an important feature of the invention.

The method of the invention relocates a ROM version of the system into RAM. The relocation involves copying the code image into RAM, then modifying those locations of this image which are position dependent. Those locations of the operating system which require modification are stored in a relocation table, stored at a well known location in ROM memory. The relocation logic is part of the system software, invoked during the initialization phase of the system startup, and is not part of the boot ROM loader.

The system relocation is only done in environments where there is sufficient memory available. By way of example, for a basic system using the method of the invention, the minimum amount of memory which supports system relocation is a specified threshold of 32 MBytes. In terms of practical applications, it has been deemed that this is enough RAM to store a copy of the code and still have sufficient memory available for the buffering of pages and other data requirements, particularly in the case of a copier/printer device. It is expected that the addition of features to these devices will affect the minimum relocation memory, requiring either more or less than the threshold used as an example herein. This quantity will be referred to as minimum relocation memory. As the method of the invention is embedded as part of an operating system, this module is referred to as the embedded relocating loader.

THEORY OF OPERATION

Embedded Relocating Loader Overview

The following discussion is based upon the constructs of a UNIX development platform, the Diab and Greenhills compiler and linker, the pSOS kernel, and the ISI initialization logic. The particular file names, linker labels and directions are specific to a preferred embodiment of the invention in a specific application. It will be readily apparent to those of ordinary skill in the art that the methods described herein may be extended to other tool sets and kernels.

There are two distinct processes associated with the embedded relocating loader, those done during system creation, i.e., build time, and those done during system initialization, i.e., boot time. The process of creating a system has to generate the relocation data structures; the system initialization process has to do the relocation, modifying the memory organization if sufficient RAM is available.

To facilitate these processes, the RAM and ROM images need to be nearly identical, thus facilitating the step of copying the ROM version into RAM memory, followed by adjusting those position-dependent locations in memory. Given similar binary images, the number of differences is small, and is suitable to storing in a table, to be accessed after the code has been copied.

Memory Organization Overview

Basic copier/printer systems generally include 8 MByte of ROM memory, and between 2 MByte and 80 MByte of RAM memory. Of the 8 MByte of ROM, 7 MByte is generally available for the code and initialized data constructs, the residual 1 MByte is used by the boot loader.

Figure 3:
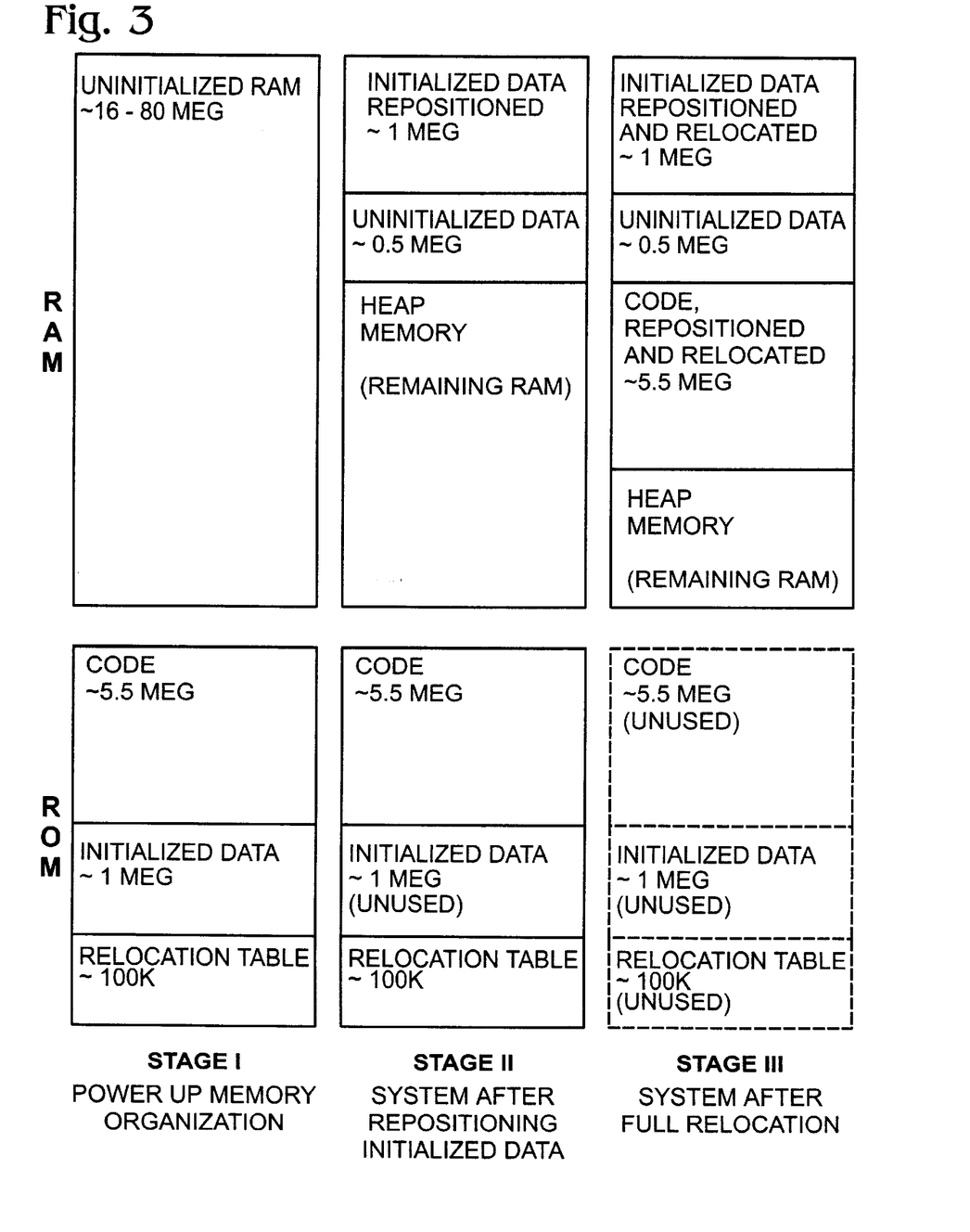
FIG. 3 is a memory map of the method of the invention in various stages of operation.

FIG. 3 illustrates the organization of memory during the system relocation process. FIG. 3 depicts the organization of memory during three stages of system startup:

Stage I: upon system power-up (the power-up stage);

Stage II: after the initialized data sections have been repositioned to RAM, required for all systems, independent of the amount of memory available (the repositioning stage); and Stage III: after the code and data sections have been fully repositioned and relocated (the operational stage).

These three stages are invoked for systems which have minimum relocation memory of RAM; if a system has less memory, the startup process terminates after Stage II, and the code executes out of ROM with the data being accessed from RAM.

The repositioning of the initialized data from ROM into RAM is done as part of low level system initialization, in an assembly language file init_a.s. This always occurs as part of the initialization, independent of the system decision to relocate the entire operating system into RAM. The logic to relocate the operating system resides in a source file sysinit.c.

It is important to note that the Stage II diagram corresponds to the memory map of the system prior to the introduction of the embedded relocating loader. In the case of a system with 80 MByte maximum memory, there is approximately 78.5 MByte available for the heap data space. With the advent of the relocating loader, the maximum amount of heap memory is reduced to approximately 73 MByte. In such a case, the amount of ROM space available for future development is approximately 0.5 MByte. Strategies for releasing more ROM for development may be provided, and are described later herein.

System Build Process Overview

The system must be able to support environments in which there is adequate memory for system relocation, executing from RAM, as well as those minimally configured systems, executing from ROM. To achieve this, given the ROM memory limitations of the system, there must effectively be two systems in one. This is achieved by linking two versions of the system, one RAM based and the other ROM based, with identical link directives, with the exception being the location of the code section. If there were sufficient ROM available for another entire version of the system, the process would be much easier, for then a simple RAM version could be stored in ROM, to be copied and executed if memory permitted. In the method of the invention, the ROM version of the embedded application is modified during initialization, as a function of the RAM-ROM differences stored in the relocation table. The modified ROM version becomes a RAM version of the application, which is stored in RAM, and which executes entirely from RAM.

In absence of the relocating loader, the system build process creates a single file of output, pages.hex. To support the logic of the relocating loader, two distinct targets are created: page_rom.hex and page_ram.hex. The difference between these two files is used to create the relocation table, relocationtable.hex. This file is concatenated with the ROM image of the system, page_rom.hex, to create the final output, pagei.hex.

While the process itself is straightforward, it is somewhat lengthy, as there are several intermediate files created. A high-level flow diagram, shown in FIG. 4, generally at 60, provides an overall view of the process of creating the system with the embedded relocating loader and relocation table.

Linker Issues

The link process creates a binary image which includes of several sections. In broad lines, these fall into the categories of code and data. The data is itself comprised of several sections: .data, .sdata, .bss, .sbss, and freemem; the code, i.e., text, portion is comprised of three sections: .text, .text_ks, and .text_ic. For the purpose of this description, "data" refers to the first four data sections: .data, .sdata, .bss, .sbss; "code" refers to the three text sections: .text, .text_ks, text_lc; and "heap" refers to freemem. Further link map details are described later herein.

In order to minimize the differences between the RAM and ROM images page_ram.hex and page_rom.hex, the linker commands for the two targets have identical data and heap directives; they differ only in the position of the code section. This is illustrated by the following link directives and memory maps.

| The [pseudo] link directives for the RAM target: | |
| --- | --- |
| data | 0x80001000 |
| heap | align(0x100) |
| code | align(0x100) |

| The [pseudo] link directives for the ROM target: | |
| --- | --- |
| data | 0x80001000 |
| heap | align(0x100) |
| code | 0x8F100000 |

| Typical [pseudo] memory map for the RAM target | | |
| --- | --- | --- |
| Section | Start | Size |
| data | 0x80001000 | 00132C80 |
| heap | 0x80133D00 | 00000000 |
| code | 0x80133D00 | 00540800 |

| Typical [pseudo] memory map for the ROM target: | | |
| --- | --- | --- |
| Section | Start | Size |
| data | 0x80001000 | 00132C80 |
| heap | 0x80133D00 | 00000000 |
| code | 0x8F100000 | 00540800 |

The arrangement of the sections, data, heap, and code, is different than the canonical code, data, heap usually found in applications and operating systems. To make the RAM based system compatible with the ROM system, the data section should be positioned at the beginning of available memory. The heap section follows naturally after the data section in the ROM system. Again, for compatibility, the RAM system uses the same model. The appearance of the code section next is expected in the ROM system, for it resides in its own physical address space in flash memory and does not collide with the heap section. In the RAM system, though, these seem to occupy the same address space. It is the responsibility of the relocating loader is to copy the code section from ROM to the beginning of the heap section, then increase the pointers to the beginning of heap memory appropriately.

The linker used in this process is part of the Greenhill's Tool Set, Version 1.8.7b. This description is valid for this linker. Although it is assumed that the principles on which the relocating loader is built will be valid for other linkers, this assumption should be verified if a different set of tools is used. This may be accomplished by inspecting the link maps and verifying that the sections are aligned as described in this document.

Relocation Table Creation

Once the two different RAM and ROM target images have been created, the next part of the process is to create the relocation table. The first step is to compare the s-records of the associated hex files for the two binary image hex files, page_ram.hex, and page_rom.hex. It is assumed that each line in one hex file corresponds to the same line in the other hex file. This means that the code, or data, for line 1234 in page_ram.hex is performing the same function as is line 1234 in page_rom.hex, and that the two lines differ only by position dependent quantities.

The two files are compared byte-by-byte; for each difference encountered the address of the RAM image is noted, along with the difference between the ROM and RAM value. This becomes the basis of the filediffs file, shown in FIG. 4. The file is described more fully in the Data Structures section, later herein.

An inspection of the filediffs file shows that, although there are many addresses between the two systems which are different, the actual relocation values, i.e., the numerical difference of one position-dependent location in memory between the ROM and RAM images, are few in number. There are only six distinct relocation values encountered when the two images are compared. This fact becomes the seed idea in the compression of the relocation data, as the relocation table may be efficiently organized by relocation value, with all of the pertinent relocation addresses following.

The file of differences, filediffs, is used to create the basic relocation file, relocationfile. Effectively, the relocation addresses are sorted by the relocation value, the differences between the ROM and the RAM images. That is to say, all addresses for a given relocation value of 0x00000ECC, for instance, are stored before those for the relocation value of 0x00BEC100. The structure of this file is described more fully later herein.

The final step in creating the relocation table data is to take the relocationfile and compress the data. It should be noted that for a given relocation value, the addresses associated with the value are often close to one another, usually within 256 bytes, and it is therefore possible to create a smaller table, by just storing the start address and the offset, or delta, to the next address. The start address requires a full four bytes, 32 bits, while the offset quantities require only one byte. The output of this compression operation is the "C" compilable file relocationtable.c. The data in this file is slightly compressed. If necessary, additional compression may be performed.

Target Output Creation

The now compressed "C" file relocationtable.c is compiled and linked into its own hex file, relocationtable.hex. The relocation table is linked to a well known location, e.g., 0x8F7E0000. Should there be any memory constraints, the relocation table may be positioned directly after the code section. The data s-records of this file are then concatenated with the ROM hex file, and a checksum is calculated for this concatenated file. The final output of this operation is the creation of the file pagei.hex, which may be loaded into ROM and booted.

Relocation Operation

During system startup, if the amount of RAM installed in the system is minimum relocation memory, e.g., 32 MBytes or more, the initialization logic copies the code section into the area of memory just above the data section in RAM. The heap pointer is increased by an amount equivalent to the size of the code section. The relocation table is read from its well known location in ROM, and each position-dependent location is modified so that it may execute correctly from RAM.

RELOCATION DATA STRUCTURES

Data Files

The process of creating a relocation table requires creation of several intermediate files, derived from the differences between the RAM and ROM image files.

Filediffs

This file contains the address and relocation value for all position dependent locations in the system. This file is sorted by address. Although there are many relocation addresses, inspection will indicate that distinct relocation values are few in number. There may be as few as six distinct relocation values. Representative file excerpts are:

| Address | Value | |
|---|---|---|
| 0x80002850 | 0x0efcc300 | /* data section */ |
| 0x80002858 | 0x0efcc300 | /* Note that this value is the */ |
| 0x80002860 | 0x0efcc300 | /* difference between the code */ |
| 0x80002864 | 0x0efcc300 | /* of the ROM and RAM images. */ |
| 0x80133d28 | 0x00000efd | /* code section */ |
| 0x80133d2c | 0xffffc300 | /* Note the differing relocation values, */ |
| 0x80133d64 | 0x03bf30c0 | /* reflective of the various instruction */ |
| 0x80133dc0 | 0x03bf30c0 | /* encodings on the R4700 */ |
| 0x80133dd0 | 0x03bf30c0 | |
| 0x80134304 | 0x03bf30c0 | |
| 0x8013432c | 0x03bf30c0 | |
| 0x801343bc | 0xffffc300 | |
| 0x801343c0 | 0x03bf30c0 | |
| 0x801343c8 | 0x03bf30c0 | |
| 0x801343d4 | 0x00000efd | |
| 0x801343d8 | 0x0000c300 | |
| 0x801343dc | 0x00000efd | |

The data terminates with an end-of-file.

Again, it should be noted that there are only six distinct relocation values for the entire system, which has on the order of 75,000 relocation addresses to which these values apply. This number is less if the system is compiled without debug messages. The introduction of additional features will likely increase the number of relocation addresses.

Relocationfile

The file of relocation data, mnemonically called relocationfile, contains the information derived from the filediffs file, presented in a format suitable for relocation. It includes a series of relocation records. Each relocation record is a variable length structure, having an identifying relocation flag, the relocation value, and a null terminated list of addresses to which the relocation value is to be applied:

RELOCATION_FLAG
RELOCATION_VALUE
RELOCATION_ADDRESS
RELOCATION_ADDRESS
...
0x00000000

The entire relocation table is itself null terminated:

RELOCATION_RECORD
RELOCATION_RECORD
...
RELOCATION_RECORD
0x00000000

The relocation flag is the number 0x0FF1CCED. A representative record is as follows:

| 0XFF1CCED | /* magic number */ |
|---|---|
| 0x00000ef8 | /* relocation value */ |
| 0x803a9808 | /* relocation address 1 */ |
| 0x803a981c | /* relocation address 2 */ |
| 0x803a98a0 | /* ... */ |
| 0x803a9998 | |
| 0x803a99ac | |
| 0x803a99c0 | |
| 0x803a99d4 | |
| 0x00000000 | /* end of relocation record */ |

Relocationtable.c

Given the space constraints of the system, a compressed form of the above relocation table is required. To achieve this, and because most of the relocation addresses are within 256 bytes of one another, a compressed version of the relocation records includes only the relocation flag, the relocation value, the first relocation address, and the subsequent difference to the next relocation address(es):

| RELOCATION_FLAG | /* four bytes */ |
|---|---|
| RELOCATION_VALUE | /* four bytes */ |
| RELOCATION_ADDRESS_BASE | /* four bytes */ |
| RELOCATION_ADDRESS_DELTA | /* one byte */ |
| RELOCATION_ADDRESS_DELTA | /* one byte */ |
| 0x00 | /* one byte */ |

By way of illustration, the relocation record in the previous section is compressed to the following data:

| 0XFF1CCED | /* magic number */ |
|---|---|
| 0x00000ef8 | /* relocation value */ |
| 0x803a9808 | /* relocation address 1 */ |
| 0x14 | /* relocation address 2 offset */ |
| 0x84 | /* relocation address 3 offset */ |
| 0xf8 | /* ... */ |
| 0x14 | |
| 0x14 | |
| 0x14 | |
| 0x00 | /* end of relocation record */ |

Because the offset between successive addresses is stored, the use of 1 byte to indicate the majority of addresses is allowed. Even though this requires the use of more relocation records for those addresses which are not within 256 bytes of each other, the overall size of the table is reduced by more than a factor of two.

This data is converted into a 'C' file, relocationtable.c, by the utility compressrelocationtable, which takes the data from the relocationfile and compresses it, writing it out as a machine compilable file. The file includes a simple array of unsigned characters. The underlying determination of which quantities are to be considered four-byte addresses or one-byte offsets is the responsibility of the relocation logic. Each relocation record begins on a four-byte boundary; the previous relocation record is padded with zeros if necessary. Again, to illustrate, the above data is actually written out as follows:

```
0x0F, 0XF1, 0xCC, 0xED,
0x00, 0x00, 0x0E, 0XF8,
0x80, 0x3A, 0x98, 0x08,
0x14, 0x84, 0XF8, 0x14,
0x14, 0x14, 0x00, 0x00,
```

Notice that this record has two zeros at the end of the data. This does not terminate the file, rather, the second zero is used to fill out the structure to a long-word aligned boundary. A subsequent zero, long-word in length, is used to terminate the file.

Relocation Table

Figure 4:
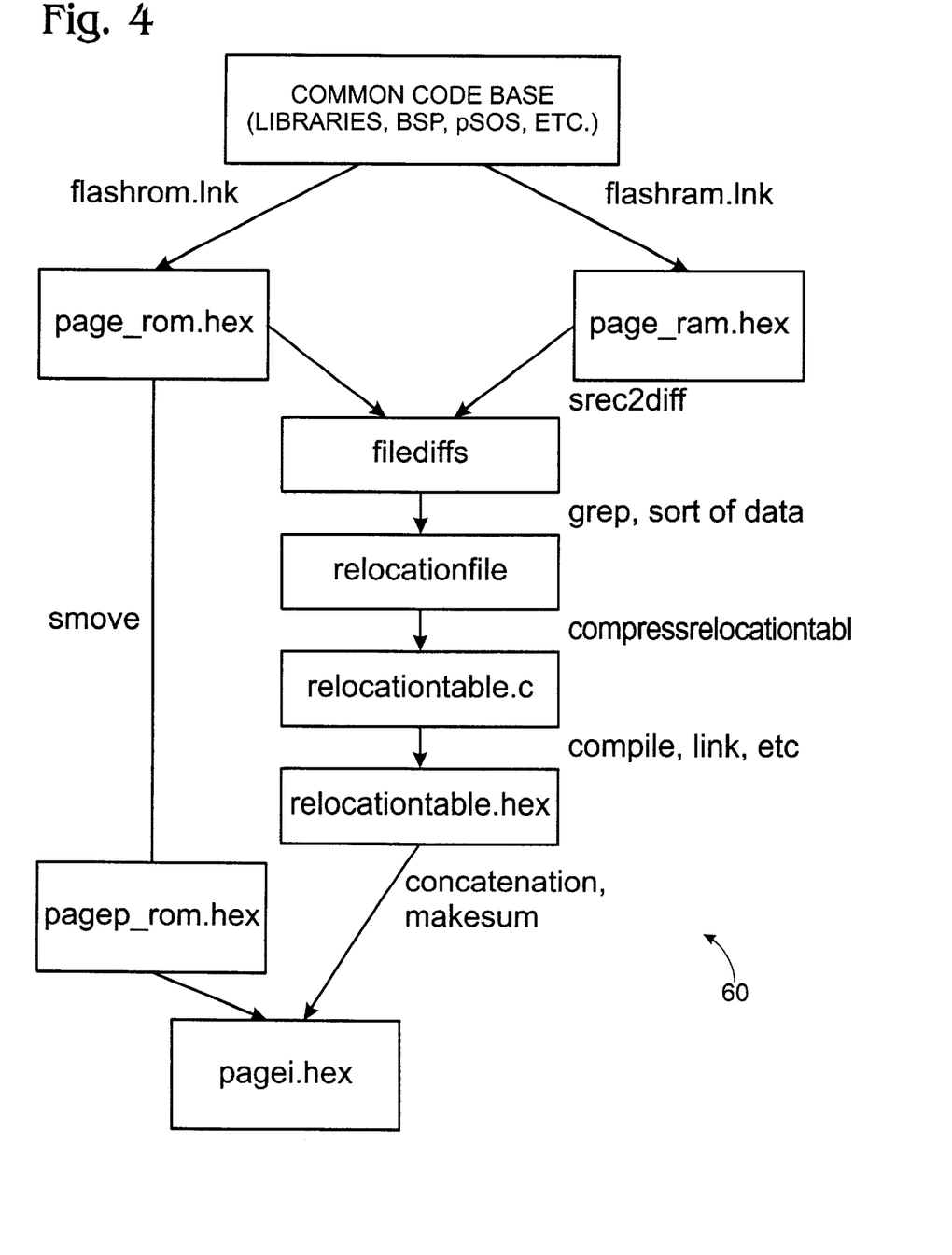
FIG. 4 is a flow chart of the method of the invention.

Once the relocationtable.c file is created, it is compiled and linked to its own hex file. The data is positioned to a well-known address, e.g., 0x8F7E00000. When loaded into ROM, this file becomes the relocation table. The hex file relocationtable.c is first concatenated with the hex file for the system, page_ram.hex, as shown in FIG. 4. A checksum is created for this composite file, allowing it to be downloaded and burnt into ROM.

The relocation table is now stored in ROM, the address of the relocation table is known to the startup code, which reads through the list of compressed relocation records. Each relocation record is null terminated, and the relocation table itself is null terminated, indicating that there are no more records for relocation.

RELOCATION ALGORITHMS

There are several steps to the creation of the final relocation table, and to the creation of the final relocation of the code. The creation of relocationfile is done utilizing various UNIX commands in a small script, the creation of filediffs and relocationtable.c is done through the specialized utilities srec2diff and compressrelocationtable, respectively.

Srec2diff

This utility compares the two hex files for the RAM and ROM images, and outputs their differences to standard output. The two files are assumed to be equivalent byte-by-byte; the only differences being the addresses of each line and the position dependent code and data.

srec2diff pseudo code

```
open files, verify integrity
for each data s-record in ramfile, romfile
    for each word in ram_s-record, rom_s-record
        if (ram_word!=rom_word)
            print (ram_address, rom_word—ram_word)
```

Relocationfile

The relocationfile is created from the filediffs data created by srec2diff. The actual creation of relocationfile is done within the body of the makefile, utilizing the UNIX utilities grep, sort, cut, and uniq. The basic flow of the script is that relocationfile is sorted by the relocation value, a relocation record is created for each relocation value by using the relocation value as a key for filtering the file with grep. The following is a brief excerpt from makefile which illustrates this procedure:

```
relocationfile: filediffs
    rm -f relocationfile
    touch relocationfile
    for i in 'cut -c12-filediffs|sort -n|uniq';\
    do\
        echo 0xFF1CCED>>relocationfile;\
        echo $$i>>relocationfile;\
        grep $$i filediffs|cut -c1-11>>relocationfile;
        echo 0>>relocationfile;\
    done
    echo 0>>relocationfile
```

Compressrelocationtable

After the creation of relocationfile, this file is compressed by a specialized utility designed to create a file which may be compiled and linked into the system. The program creates compressed relocation records, writing word-wide quantities for the relocation flag, the relocation value, and the first relocation address, but writes byte-wide quantities for the address offsets. All compressed relocation records are terminated with a byte-wide zero offset value, and all compressed relocation records are aligned on a long-word boundary, zero padded if necessary. The data is written to standard output.

Compressrelocationtable Pseudo Code

```
open file, verify integrity
for each relocation record
    /* write three long words for start of relocation record
    */
    write relocation flag
    write relocation value
    write first relocation address
    /* Loop through each address in the relocation record
    */
    while next address !=0
        /* check if delta can be written within 1 byte */
        if (next address—first address<256)
            write (next address—first address)
        /* if not, terminate this record and start the next */
        else
            write 0, round up to word boundary
            write relocation flag,
            write relocation value
            write next address
        /* update the address indicators, and iterate */ first
            address=next address
    /* end of relocation record, null terminate */
    write 0, round up to word boundary
/* end of relocation table, null terminate */
write 0
```

SYSTEM INITIALIZATION

The process of relocating the code during system initialization requires two steps: 1) copying the ROM code section image to the appropriate location in RAM, adjusting the heap section pointers, and 2) Adjusting the data and code sections with the values in the relocation table to their appropriate RAM values. It is estimated that the amount of time required for both of these tasks is comfortably less than one second, perhaps on the order of 750 milliseconds.

Section Copy

In order to correctly identify the beginning and end of the code section, two special labels are created. These variables are defined in the psosystem/configs/std directory, in the assembly language files begin.s and end.s. The labels are TextBegin and TextEnd. It is possible to use linker-generated symbols to indicate the beginning and ending of the overall text section, however, the symbols are dependent upon the Greenhill's linker and are not generic, e.g., $_{13}$hsend_text_nr would indicate the end of the text sections. Eliminating the dependency on the vendor of the tool set and creation of original labels seems to be a better approach.

If there is sufficient memory for system relocation, i.e., it has minimum relocation memory of RAM, the startup logic copies the entire block of ROM between the two labels TextBegin and TextEnd to the beginning of the heap section, defined by the label FreeMemStart. This is a straightforward transfer, using the memcpy( ) routine. To assure system integrity, after the data transfer, it is required that the CPU cache be cleared.

After the code section has been copied, the pointer to the heap section is modified. To facilitate this, a dedicated pointer, FreeMemStartPtr, is used to indicate the beginning of the heap section. Once the system has been copied, the value in FreeMemStartPtr is increased by the size of the code section. The operations of copying the code section and adjusting the FreeMemStartPtr are illustrated by the following pseudo code:

```
if (memsize >=MINIMUM_RELOCATION_
    MEMORY)
    memcpy (FreeMemStart, TextBegin, TextEnd—
        TextBegin)
    Sys_Clear_Cache(FreeMemStart, TextEnd—
        TextBegin)/* very important!*/
    FreeMemStartPtr +=(TextEnd—TextBegin)
```

Code Relocation

The final operation is to adjust the values in the RAM image of the code and data sections which are position dependent. These locations are established in the relocation table through the relocation records. The startup logic walks through each record, adjusting the locations indicated by the first relocation address along with any subsequent addresses indicated by the subsequent address deltas.

MAKEFILE CONSIDERATIONS

The preceding description provides the basic flow of the creation of the relocation table along with its installation and the system startup. The makefile dependencies are now more extensive, as several new temporary files are created before the final hex output file is made. In the course of integrating the embedded relocating loader into the build environment, the main makefile source, bld/pagesla. inc, is modified to make the creation of the target more consistent with the dialect of make, as opposed to the script-like approach used in much of the rest of the file. The various target files and their dependency relationship follows:

Temporary Files
    page_ram ldx linker output using psos/flashram.lnk
    page_rom ldx linker output using psos/flashrom.lnk
    page_ram.hex elf2sr output
    page_rom.hex elf2sr output
    page_rom.hex smove output with data repositioned to ROM space
    filediffs srec2diff output from page_ram.hex, page_rom.hex
    relocationfile grep, sort output from filediffs
    relocationtable.c compressrelocationtable output from relocationfile
    relocationtable.o ccx output of relocationtable.c
    relocationtable ldx output from relocationtable.o with psos/relocationtable. lnk
    relocationtable.hex elf2sr output
    tmp.hex cat of relocationtable.hex, pagep_rom.hex
    pagei.hex makesum output from tmp.hex, ultimate target Makefile Hierarchy
    The hierarchical dependency tree is as follows
    pagei.hex
        pagep_rom.hex
            page_rom.hex
                page_rom
        relocationtable.hex
            relocationtable
                relocationtable.o
                      relocationtable.c
                      relocationfile
                      filediffs
                      page_ram.hex
                      page_ram
                      30 page_rom.hex
                      page_rom Alternative Make Strategy, Concurrent Download, Debugging Given that the system relocation occurs during system startup, it is not possible to use the multi debugger for testing and debugging the relocation algorithms. The only tool for debugging the relocating loader is the use of printf statements and outputs to the LED ports, admittedly a laborious and time consuming approach to the development/debugging cycle, particularly as the amount of time required to link and download the exemplar system has been measured to be in excess of ten minutes. In order to reduce the length of the development cycle, a variant of the makefile was created which allows the relocation table to be created separately from the main hex file. This approach facilitates concurrent downloading of the system while creating the relocation table, significantly reducing the overall time of the development cycle. This is done only as a development aid. Ultimately this could be automated.

To use the concurrent download capability, there are two changes which must be made. The first of these is to set the CONCURRENT_DOWNLOAD flag in the pagesla.inc file. This is well indicated within the file documentation. The second of these is to change the starting address of the relocation table, which instead of being based at, e.g., 0x8F7E0000, it is based at, e.g., 0x80800000. This change is facilitated with the use of a local compiler define, also named CONCURRENT_DOWNLOAD, located in the file sysinit.c. As this compiler flag is integrated into the development platform, the operation is seamless, involving only a change to the configuration file, local.cnf: Alternately, the file is moved from configs/std/sysinit.c to the /psos directory, with the local lmakefile/Makefile reflective of the location of this file.

With the CONCURRENT_DOWNLOAD feature, the makefile starts sending the hex file for the ROM image in background, while finishing the creation of the relocation table in foreground. That is, it invokes the copy command     cp pages_rom.hex/dev/ecpp0 & while linking a version of page_ram.hex, comparing the differences, creating the file differences and relocation table, and ultimately relocationtable.hex. After the ROM image of the code is finished downloading, the relocation table may be downloaded with     cp relocationtable.hex/dev/ecpp0

The filepages_rom.hex is linked with directives to load at, e.g., 0x8F100000 but not to boot after the code is loaded; the relocationtable.hex file is linked to load at, e.g., 0x8F7E0000, and then to begin execution at, e.g., 0x8F 100000 automatically after the table has been loaded, thus the loading of the pages_rom.hex file first.

Memory Utilization Issues

The relocation table is stored in a modestly compressed format, occupying approximately 100k of ROM memory, utilizing about 1.87 bytes per relocation address. If there are additional memory constraints, additional density may be attained by enhancing the compression algorithm. Two ways to acquire more space include (1) as previously noted, because the differences between the two successive addresses is always a multiple of four bytes, the delta between adjacent addresses may be divided by four and still fit within one byte, so it is possible to support a larger difference between addresses, from 256 to 1024 bytes, allowing for fewer of relocation records; and (2) support more than one type of relocation record, to allow for those sequential relocation addresses which separated are greater than the maximum delta (256 or 1024) being used. Compiling the system with the –O optimization flag and the DebugFlag set to "2" produces an environment with fewer relocation addresses.

Additional space may be claimed by relaxing the constraint of having the relocation table linked to a fixed location in memory, and instead have it positioned at the end of the code sections. This requires the creation of a dedicated section having its own external declaration, along with some changes in the link directives and the build procedures.

Data Structure Observation

The relocation table is a mix of long-word and byte quantities, with memory constraints forcing the compressed data structure. The table may be recast in a more traditional structure format, i.e., something along the lines of:

```
typedef struct
{
        ULONG       stamp;
        ULONG       value;
        ULONG       addr;
        UCHAR       delta[0];
} RELOCATION_RECORD;
```

Boot ROM Notes

Currently, there is generally about 1 MByte reserved for the boot loader in flash ROM. The boot loader generally requires about 0.25 MByte, therefore, if the controller has greater memory needs, some of boot loader memory may be used.

Linker Considerations

The contents of the sections are described in the pSOS-ystem Host Tools manual; in the method of the invention they are as follows:

| | |
|---|---|
| .data | initialized data |
| .sdata | small model initialized data |
| .bss | uninitialized data [set to zero during system startup] |
| .sbss | small model uninitialized data |
| .freemem | heap memory, used for kernel data structures, malloc( ), page rendering [this section is intended to be all the remaining physical memory (RAM), after the system is loaded and has initialized itself] |
| .text | system code, Postscript fonts |
| .text_ks | pSOS kernel code |
| .text_lc | pREPC runtime library |

Heap Memory

When the linker allocates the heap section, freemem in the Greenhill's environment, there is no explicit space declared for this in the linker directives, nor does the link map indicated that is there any space reserved for this. It is the general responsibility of the startup code to determine at run-time how much of the available memory should be used for the heap section, and to set the associated variables appropriately. In the method of the invention, the startup model is that all of the remaining physical memory after the code and data sections is to be used for the heap section, and configures the pSOS structures accordingly.

Miscellaneous Files

In the pSOS directory, there are new files with link directives:

flashrom.lnk
flashram.lnk
relocationtable.lnk
flashromboot.lnk
flashramboot.lnk

The first two of these files are used to create the targets page_rom.hex and page_ram.hex, respectively. The relocationtable.hex file is created by relocationtable.ink. The final two files are to be used only with the development aide of CONCURRENT_DOWNLOAD.

The invention is fundamentally different than prior art as (1) it does not require specialized hardware; (2) code image executes successfully from ROM, and does not require relocation to execute; and (3) an executable is not compiled for position independent code (PIC) or position independent data (PID); i.e., the code and data is copied to be absolutely addressed, but may be modified to an other absolute address space at boot time depending upon the system configuration.

In summary, the current invention includes the storing an executable image of the application and/or operating system in ROM, the storing of relevant relocation information in ROM, the logic to assess the amount of memory available in the system, logic to move the executable ROM image into RAM, and logic perform necessary modification to the RAM image of the code to accommodate the different address space of the executable image.

Thus, a dynamic system relocation based on availability of system memory has been disclosed. It will be appreciated that further variations and modifications thereof may be made within the scope of the invention as defined in the appended claims.

We claim:

1. In a computer system having an embedded application, a method of dynamic system relocation, comprising:
   creating a ROM version of an embedded application which is executable from ROM;
   creating a RAM version of the embedded application which is executable from RAM;
   comparing the RAM version of the embedded application to the ROM version of the embedded application to identify differences between the RAM version and the ROM version;
   storing the differences between the ROM version and the RAM version in a relocation table;
   storing the ROM version of the embedded application and the relocation table in ROM;
   on system initialization; conditionally copying the ROM version of the embedded application into RAM;
   modifying the copied ROM version now in RAM as a function of the differences stored in the relocation table; and
   executing the embedded application from the RAM version of the embedded application.

2. The method of claim 1 which includes, on system initialization, before said copying, determining whether the system has minimum relocation memory; and, if not, operating the system from the ROM version of the embedded application.

3. The method of claim 2 which includes three stages of operation and wherein said determining takes place during stage II.

4. The method of claim 1 wherein said comparing includes building a relocation table by comparing the RAM version of the embedded application to the ROM version of the to embedded application on a byte-by-byte basis; and determining relocation values for storage in the relocation table.

5. The method of claim 4 wherein said determining relocation values for storage includes storing, for a relocation value, a start address and an offset to a next address.

6. In a computer system having an embedded application, a method of dynamic system relocation, comprising:
   creating a ROM version of an embedded application which is executable from ROM;
   creating a RAM version of the embedded application which is executable from RAM;
   comparing the RAM version of the embedded application to the ROM version of the embedded application to identify differences between the RAM version and the ROM version;
   to storing the differences between the ROM version and the RAM version in a relocation table;
   storing the ROM version of the embedded application and the relocation table in ROM;
   determining whether the system has minimum relocation memory; and, if not, operating the system from the version of the embedded application executable in ROM; and, if so, on system initialization; conditionally copying the ROM version of the embedded application into RAM;

modifying the copied ROM version now in RAM as a function of the differences stored in the relocation table; and executing the embedded application from the version of the embedded application executable from RAM.

7. The method of claim 6 which include three stages of operation and wherein said determining takes place during stage II.

8. The method of claim 6 wherein said comparing includes building a relocation table the RAM version of the embedded application to the ROM version of the embedded application on a byte-to-byte basis; and determining relocation values for storage in the relocation table.

9. The method of claim 8 wherein said determining relocation values for storage includes storing memory pointers, including, for a relocation value, a start address and an offset to next address.

10. The method of claim 9 wherein said storing the RAM version of the embedded application includes copying the ROM version of the embedded application to RAM; adjusting memory pointers in RAM; and labelling the beginning and ending of the RAM version.

11. In a computer system having an embedded application, and which operates in three stages, including a power-up stage, a repositioning stage and an operational stage, a method of dynamic system relocation, comprising:

creating a ROM version of an embedded application which is executable from ROM;

creating a RAM version of the embedded application which is executable from RAM;

comparing the RAM version of the embedded application to the ROM version of the embedded application to identify differences between the RAM version and the ROM version;

storing the differences between the ROM version and the RAM version in a relocation table;

storing the ROM version of the embedded application and the relocation table in ROM;

determining, during the reposition stage, whether the system has minimum relocation memory; and, if not, operating the system from the version of the embedded application executable in ROM; and, if so, on system initialization; conditionally copying the ROM version of the embedded application into RAM;

modifying the copied ROM version now in RAM as a function of the differences stored in the relocation table; and executing the embedded application from the version of the embedded application executable from RAM.

12. The method of claim 11 wherein said comparing includes building a relocation table by comparing the RAM version of the embedded application to the ROM version of the embedded application on a byte-by-byte basis; and determining relocation values for storage in the relocation table.

13. The method of claim 12 wherein said determining relocation values for storage includes storing memory pointers, including, for a relocation value, a start address and an offset to a next address.

14. The method of claim 13 wherein said storing the RAM version of the embedded application includes copying the ROM version of the embedded application to RAM; adjusting memory pointers in RAM; and labeling the beginning and ending of the RAM version.

* * * * *